L. C. Palmer.
Making Farm Implements.

Nº 42,305.  Patented Apr. 12, 1864.

Witnesses
Normand Adams
Roland Hitchcock

Inventor
L. C. Palmer

N. PETERS, PHOTO-LITHOGRAPHER, WASHINGTON, D. C.

UNITED STATES PATENT OFFICE.

LUCIUS C. PALMER, OF WINCHESTER, CONNECTICUT.

IMPROVEMENT IN MANUFACTURE OF SCYTHE RODS OR BARS.

Specification forming part of Letters Patent No. 42,305, dated April 12, 1864.

*To all whom it may concern:*

Be it known that I, LUCIUS C. PALMER, of Winchester, in the county of Litchfield and State of Connecticut, have invented a new and improved mode of manufacturing scythe-rods or bars of which the plates of scythes are made; and I hereby declare that the following is a clear, full, and exact description of the same, reference being had to the annexed drawings, making a part of this specification, in which—

Figs. 1 and 7 show piles made up ready for welding—Fig. 1 to be handled with tongs in the whole process of welding, and in Fig. 7 the lower or under plate, $a$, is left any convenient length, to be used as a handle to take the weld with, and then cut off at $j\ j$.

To enable those skilled in the art fully to understand and manufacture by my invention, I proceed to describe it.

Figure 1:
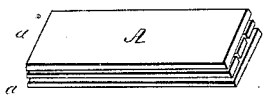
Figure 1 is a side and end view of a pile of iron and steel as arranged for welding.
Figure 2:
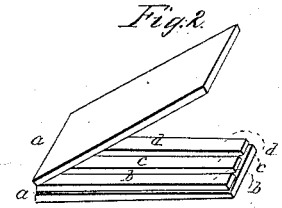
Fig. 2 shows the cap or iron plate of Fig. 1, raised from off the steels $b\ c\ d$, to show the order in which the steels $b\ c\ d$ are placed in the pile; $b$ and $d$ back-steels; $c$, the edge-steel; $a\ a$, the iron plates.
Figure 3:
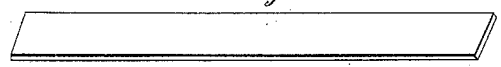
Fig. 3 shows the pile, Fig. 1, drawn or rolled into a bar of equal width and thickness at both ends.
Figure 4:
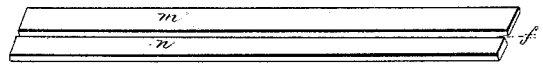
Fig. 4 shows the bar slit in the line $f\ f$.
Figure 5:
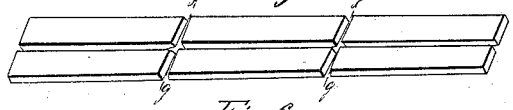
Fig. 5 shows the bar cut and severed transversely in the lines $g\ g$. Each of the parts of Fig. 5 is then drawn or rolled a true taper or any other form that may be desired from the heel end, $h$, to the point end, $i$, as represented in Fig. 6.
Figure 6:
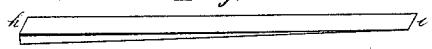

Fig. 1 represents a pile of iron and steel, arranged for two or more rods, according to the stock and number of rods wanted at one heat. $a\ a$, Fig. 1, are two flat bars of common scythe-iron (or any other form, if convenient) of equal length. Between these bars $a\ a$ are placed the back-steel $b$ and $d$ and the edge-steel $c$, as represented in Fig. 2. The edge-steel $c$ should always be placed between the back-steels $b$ and $d$ and between the plates or bars of iron $a\ a$ and lengthwise in the line $f\ f$, Fig. 4. The pile thus made up is then heated in any common welding-furnace to a welding-heat, and is then drawn or rolled into a bar, as shown in Fig. 3. The bar is then slit in the line $f\ f$, Fig. 4, this being of course through the center of the edge-steel $c$. The two bars $m$ and $n$, Fig. 4, are then cut transversely in the line $g\ g$, as in Fig. 5, into as many pieces or rods as the stock will admit of for the weight of rod wanted. These rods are then drawn or rolled a true taper (or any other form) from the heel end, $h$, to the point-end, $i$, as in Fig. 6.

Figure 7:
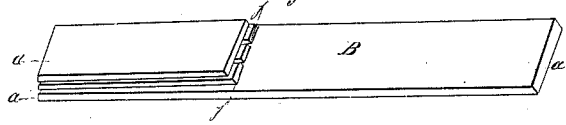

The piles, Fig. 1 and Fig. 7, show two forms for the same purpose. The pile Fig. 1 is handled with tongs in the process of welding. The pile Fig. 7 shows the lower plate of iron, $a$, left convenient length for a handle to work the same while getting a welding-heat. The pile is then cut off at $j\ j$ and passed through the rolls in the same manner as Fig. 1. By this arrangement I am enabled to weld two, four, or more rods at one and the same heat; and by placing the edge-steel $c$ in the middle of the pile, as represented in the Figs. 1 and 7, it is nearly impossible with ordinary care to burn the same. By slitting the edge-steel through the middle the best part of the same is brought to the edge of the scythe—a very important feature in this invention—and by rolling all parts of the rod from the welding-heat to the completion of the same a uniform and better-proportioned rod is the result; and by placing the edge-steel in this position the same will be found to be very near the center of the rod on the edge side when slit in two and when finished and ground to an edge.

I do not claim the piling of iron and steel in sufficient quantity for two or more scythes and drawing the same into rods or plates as my invention, that being already done; but I am not aware that the placing of edge-steel in the middle of the pile, with the back-steels upon both sides of the same, and then drawing or rolling the same into a bar wide enough for two rods, then slitting the same to form two or more rods for scythe-plates, has ever before been done.

Having thus described my invention, what I claim as new, and desire to secure by Letters Patent, is—

The arrangement of iron and steel, as in piles Figs. 1 and 7, the rolling, drawing, slitting, and working the same, as and for the purpose herein shown and described.

LUCIUS C. PALMER.

Witnesses:
NORMAND ADAMS,
ROLAND HITCHCOCK.